(12) United States Patent
Jordan, Jr.

(10) Patent No.: US 7,756,511 B2
(45) Date of Patent: *Jul. 13, 2010

(54) TEXT MESSAGE DELIVERY FEATURES FOR AN INTERACTIVE WIRELESS NETWORK

(75) Inventor: Royce D. Jordan, Jr., Lawrenceville, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 108 days.

This patent is subject to a terminal disclaimer.

(21) Appl. No.: 11/113,764

(22) Filed: Apr. 25, 2005

(65) Prior Publication Data

US 2005/0193078 A1    Sep. 1, 2005

Related U.S. Application Data

(63) Continuation of application No. 09/965,781, filed on Sep. 28, 2001, now Pat. No. 7,107,042.

(51) Int. Cl.
*H04M 11/10* (2006.01)

(52) U.S. Cl. .............. 455/412.1; 455/912.2; 709/207

(58) Field of Classification Search ............ 709/206, 709/203, 207, 217
See application file for complete search history.

(56) References Cited

U.S. PATENT DOCUMENTS

| | | | | |
|---|---|---|---|---|
| 4,790,003 | A * | 12/1988 | Kepley et al. | 379/88.18 |
| 5,559,800 | A | 9/1996 | Mousseau et al. | |
| 5,958,005 | A | 9/1999 | Thorne et al. | |
| 6,023,700 | A | 2/2000 | Owens et al. | |
| 6,044,275 | A | 3/2000 | Boltz et al. | |
| 6,108,537 | A * | 8/2000 | Comer et al. | 455/426.1 |
| 6,108,688 | A | 8/2000 | Nielsen | |
| 6,119,014 | A | 9/2000 | Alperovich | |
| 6,161,007 | A * | 12/2000 | McCutcheon et al. | 455/412.2 |
| 6,219,694 | B1 * | 4/2001 | Lazaridis et al. | 709/206 |
| 6,442,600 | B1 * | 8/2002 | Anderson | 709/217 |
| 6,601,088 | B1 | 7/2003 | Kelley et al. | |
| 6,628,935 | B1 | 9/2003 | Lawrence | |
| 6,754,484 | B1 * | 6/2004 | Hiltunen et al. | 455/412.1 |
| 6,757,713 | B1 | 6/2004 | Ogilvie et al. | |
| 6,772,143 | B2 | 8/2004 | Hung | |
| 6,836,846 | B1 * | 12/2004 | Kanevsky et al. | 713/193 |
| 7,035,904 | B1 | 4/2006 | Jordan, Jr. | |
| 7,117,248 | B1 * | 10/2006 | Jordan, Jr. | 709/206 |

(Continued)

OTHER PUBLICATIONS

Page 503 from Newton's Telecom Dictionary—13th edition of definition of packet.*

(Continued)

*Primary Examiner*—Creighton Smith
(74) *Attorney, Agent, or Firm*—Moazzam & Associates, LLC

(57) ABSTRACT

In general, in one aspect, one embodiment of the present disclosure features a message delivery method. The method includes the steps of receiving a message including delivery instruction and delivery information indicating a time at which the message is to be delivered to a communication device of a recipient; storing the message; and delivering the message to the recipient at a time indicated by the delivery information. Further, the delivery instruction and the delivery information are set by a sender of the message. Other embodiments are also provided.

20 Claims, 5 Drawing Sheets

U.S. PATENT DOCUMENTS

| | | | |
|---|---|---|---|
| 7,228,383 B2* | 6/2007 | Friedman et al. | 711/118 |
| 2002/0052218 A1* | 5/2002 | Rhee | 455/552 |
| 2002/0052923 A1* | 5/2002 | Anderson | 709/206 |
| 2002/0120697 A1* | 8/2002 | Generous et al. | 709/206 |
| 2002/0188515 A1 | 12/2002 | Nakata et al. | |
| 2003/0023482 A1* | 1/2003 | Messner et al. | 705/14 |
| 2003/0023693 A1 | 1/2003 | Nakamura | |
| 2003/0063128 A1* | 4/2003 | Salmimaa et al. | 345/810 |

OTHER PUBLICATIONS

Smith, Creighton H., Non-Final Office Action mailed Mar. 18, 2004, U.S. Appl. No. 09/965,781, filed Sep. 28, 2001.

Smith, Creighton H., Final Office Action mailed Oct. 21, 2004, U.S. Appl. No. 09/965,781, filed Sep. 28, 2001.

Smith, Creighton H., Notice of Allowance mailed Feb. 10, 2005, U.S. Appl. No. 09/965,781, filed Sep. 28, 2001.

Smith, Creighton H., Non-Final Office Action mailed Jul. 14, 2005, U.S. Appl. No. 09/965,781, filed Sep. 28, 2001.

Smith, Creighton H., Notice of Allowance mailed Nov. 3, 2005, U.S. Appl. No. 09/965,781, filed Sep. 28, 2001.

Smith, Creighton H., Supplemental Notice of Allowance mailed Apr. 6, 2006, U.S. Appl. No. 09/965,781, filed Sep. 28, 2001.

* cited by examiner

TEXT MESSAGE DELIVERY FEATURES FOR AN INTERACTIVE WIRELESS NETWORK

CROSS-REFERENCE TO RELATED APPLICATION

This application is a continuation of U.S. utility application entitled, "Text Message Delivery Features for an Interactive Wireless Network," having Ser. No. 09/965,781 filed Sep. 28, 2001, now U.S. Pat. No. 7,107,042, which is entirely incorporated herein by reference.

BACKGROUND

The present disclosure relates to an interactive wireless network, and in particular, message delivery features for text messages delivered over a wireless network.

Interactive messaging services provide for two-way communication, e.g., the transmission of text messages, between a wireless device such as a pager and an interactive wireless network connected to an external network such as the Internet. In current interactive messaging services, if a user's wireless device is turned off, not activated or outside the service range of the wireless network to be able to receive signals, a text message sent by a sender is kept in the user's "mailbox" at a storage location in the wireless system. The text message remains undelivered in the user's mailbox until the wireless device is able to receive the message. In such messaging services, the sender may not know that the user has not received an undelivered message, and might have otherwise preferred to forward the message to another user for immediate attention.

Wireless networks are also limited with respect to how much information can be sent with each data packet transmission, and are further limited by the screen on the wireless device which displays the transmitted information such as a text message.

SUMMARY

In general, in one aspect, one embodiment of the present disclosure features a message delivery method. The method includes the steps of receiving a message including delivery instruction and delivery information indicating a time at which the message is to be delivered to a communication device of a recipient; storing the message; and delivering the message to the recipient at a time indicated by the delivery information. Further, the delivery instruction and the delivery information are set by a sender of the message.

Other features and advantages of the present disclosure will become apparent from the following detailed description.

DESCRIPTION

The present disclosure relates to message delivery features in an interactive wireless communications system between a wireless device such as a pager and an external network such as the Internet. One or more gateways allow different systems, i.e., the Internet or other wide area network and a wireless communication system such as a pager service, to communicate with each other over a wireless network. In the present disclosure, the gateway functions as an interface between an interactive wireless device such as a pager and the Internet, thus providing interactive communications over a wireless network.

Figure 1:
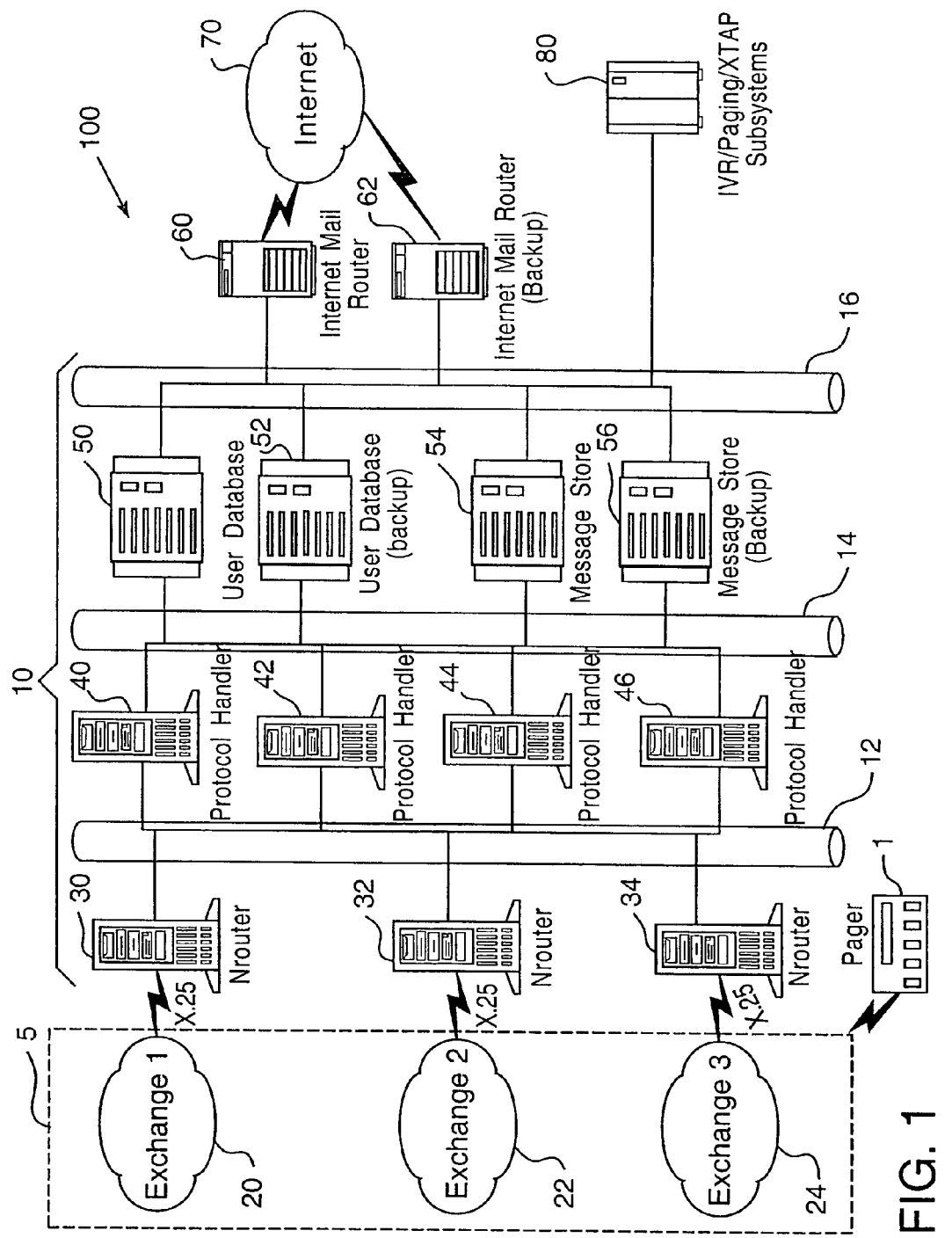
FIG. 1 is a schematic drawing of the components of an interactive wireless system according to the present disclosure.

FIG. 1 shows the components of an interactive wireless system 100 according to the present disclosure. A wireless device such as a pager 1 communicates with a wireless communication network 5. An example of such a wireless communications network uses the Mobitex® technology of the Cingular Interactive Intelligent Wireless Network service provided by Cingular Wireless. The features of the present disclosure may be implemented, e.g., by Cingular Wireless's BVI+ Interactive Messaging Service.

The Mobitex® network is a two-way wireless data service that can be connected with other complimentary networks. A wireless data service such as the Mobitex® network includes a hierarchy of communications systems that can provide nationwide wireless service through a network of base stations and local switches under the control of higher order regional switches or exchanges. A wireless device such as a pager may operate with a wireless communications system using an over-the-air protocol such as HP98 or the Blackberry protocol developed by RIM.

Gateway 10 processes data received, e.g., from the Internet 70 for use in wireless communication network 5. The components of gateway 10 may be connected over an internal network 12, 14, 16, which may be a local area network (LAN). One or more wireless network exchanges such as Mobitex® regional switches 20, 22, 24, which may be at separate locations, communicate with gateway 10 through Nrouters 30, 32, 34. The communication between regional switches 20, 22, 24 and Nrouters 30, 32, 34 may use an X.25 protocol. Up to two dual-ported connectivity cards, e.g., those manufactured by Eicon Networks, can be placed in each Nrouter, permitting a total of four Fast-Sequenced Transport (FST) connections per Nrouter. Gateway 10 can handle up to 255 Nrouters.

The communications received by Nrouters 30, 32, 34 are processed by a series of protocol handlers 40, 42, 44, 46. The protocol handlers communicate with the Nrouters using X-sockets over internal network 12. Such sockets are point-to-point, two-way software communications interfaces that direct the protocol handlers to access the internal network by creating a communications end-point or socket and returning a file descriptor with which to access that socket. The underlying protocol for packaging and decoding text messages sent by wireless devices and received by the gateway is Simple Mail Transport Protocol (SMTP).

An unlimited number of protocol handlers may be employed. Each protocol handler may include up to five protocol processes, which may be any combination of HP98, HP99 or HPID-4 processes. Each protocol processor may back up the other protocol processors automatically. The protocols handled by protocol handlers 40, 42, 44, 46 specify that message storage and internal email access may be handled by the UNIX standard Network File System (NFS) distributed file system from SUNSOFT, which allows data to be shared across the network regardless of the protocol. Each protocol handler maintains a database cache, i.e., a small, fast memory holding recently accessed data, to speed up internal network communications and to limit database access requests over the LAN.

Protocol handlers 40, 42, 44, 46 process information contained in user database machines, e.g., user database 50, user database backup 52, message store 54 and message store backup 56. The protocol machines communicate with the database machines using X-sockets over internal network 14. The database machines contain an interface to content addressable memory (CAM) (not shown) for updating information, e.g., user account information and status. Multiple backup machines may be used in gateway 10, each being synched automatically by sockets communications.

The user databases of the gateway may be configured with a directory structure. Every user account stored in the user database has a unique identifier such as a Mobitex® Access Number.

The results of protocols processed by protocol handlers 40, 42, 44, 46 using data from the user database machines are communicated externally to gateway 10 via network 16. An Internet mail router 60 and Internet mail router backup 62 connected to the internal network handle inbound and outbound communications traffic with an external network such as the Internet 70, as well as X-sockets traffic. If necessary, a separate X-sockets machine and backup machine (not shown) can be added. The transport protocol for communications over the Internet may be, e.g., TCP/IP or TELNET for remote login.

The internal network is also connected to wireless network subsystems 80 that communicate through wireless network 5. Examples of wireless network subsystems are an Interactive Voice Response (IVR) system which processes remote entries by a user from a touch tone telephone to query a database and obtain computerized voice responses, and a wireless paging system using an advanced XTAP protocol.

The gateway may be configured from a standard Santa Cruz Operation (SCO) UNIX system, with the web access program being Windows NT by Microsoft. The system may use both TCP/IP and UDP for communications, and hypertext markup language (HTML,) may be used to support Internet web browsers, including those provided by Netscape and Microsoft. The computer language used by the gateway components may be in the C programming language, Java or HTML. The message delivery features of the present disclosure may be implemented in the C programming language.

The gateway as configured in such a wireless communications system includes a mailbox for the user of the wireless interactive device, e.g., in message store 54. For example, when a sender sends a text message over the Internet to a user of a wireless device, the gateway stores the message in the user's mailbox and handles the communications and transmissions protocols to deliver the message over the wireless network. Based on information about the user in the user database, the gateway determines the user's wireless device type, and the gateway is programmed to handle a variety of protocols for different wireless devices. The gateway can access profile information, such as user preferences, for the user stored in the user database. The gateway also uses information in the user database to ensure that the user is a valid subscriber to the wireless service and to maintain billing information based on usage. The gateway performs the important function of managing the amount of data flow in the internal network and the volume of communications traffic over the wireless network, which has a limited bandwidth and which handles limited size data packets.

In operation, the gateway must first determine if the user's interactive wireless device is "on air" or capable of receiving messages. Depending on the on-air status of the interactive wireless device, the gateway delivers a message in the user's mailbox to the device.

A text message may be sent to a user of a wireless device through an external network that communicates with the wireless network. The features of the wireless network are controlled by the gateway, which issues the text message to the user. The present disclosure relates to text commands placed within or appended to the body of a text message to address and control the message delivery mechanism for the wireless service. The text message and related commands may be created and specified, e.g., using any Internet-compatible email service such as Microsoft Outlook.

The present disclosure concerns the use of key words or commands embedded in text messages or as SMTP headers to text message transmissions as instructions to the gateway for controlling the delivery of messages to the wireless device. The message delivery features can also be set up as SMTP-type leaders to automatically insert the command into the body of the text. Each command has an SMTP header equivalent, which may be implemented, e.g., as a windows-type shortcut button in an email program.

The gateway recognizes the key words as instructions to implement delivery protocols for the messages to which they relate. The key words have a format that is not likely to be used in a typical text message, and which provide a clear instruction for the sender, the user and the gateway. Since the message can be placed in the body of the text message itself, it may be recognized by any interactive wireless system protocol.

Accompanying the key words are numeric values which set the parameters for the message delivery features. The protocol handlers may be programmed to recognize a variety of formats, e.g., for specifying the date and time. For example, if a single number is specified, it may be read as a number of minutes for the gateway to wait before carrying out the protocol for the requested feature. Alternatively, the sender may specify the time and date in a format such as hh:mm/DD/MM, where hh:mm represents the time as hour hh and minute mm and DD and MM represent the day and month, respectively. When the time is specified, the sender may further indicate in which time zone he or she is located so that the gateway will apply the delivery feature at the correct time for the user.

To carry out the message delivery features of the present disclosure, the gateway includes a protocol that may append a file name flag to the message, whether the message is placed in the user's mailbox or at another storage location. The file name flag includes the date and time that the delivery feature is to be applied to the message. When the specified date and time are reached, protocols in the gateway open the designated file and perform the requested message delivery feature.

The message delivery features of the present disclosure are performed and controlled by the gateway. Such gateway functions are accessible by the Internet or an interactive wireless device, and do not rely on the operation of any Internet application or client application in the wireless device itself. Thus, these features are entirely user-initiated and user-controlled.

Expired Message Feature

One feature of an interactive wireless system of the present disclosure allows a sender to send a message to the user of a wireless device that will automatically "expire" or lapse if it is not received by the wireless device by a specified date and time. For example, a user may not be able to receive a message within a specified time period because the wireless device is outside the service range of the wireless network or is turned off. Otherwise, if the wireless device is on air and within range, it will immediately receive the message placed in the user's mailbox.

Figure 2:
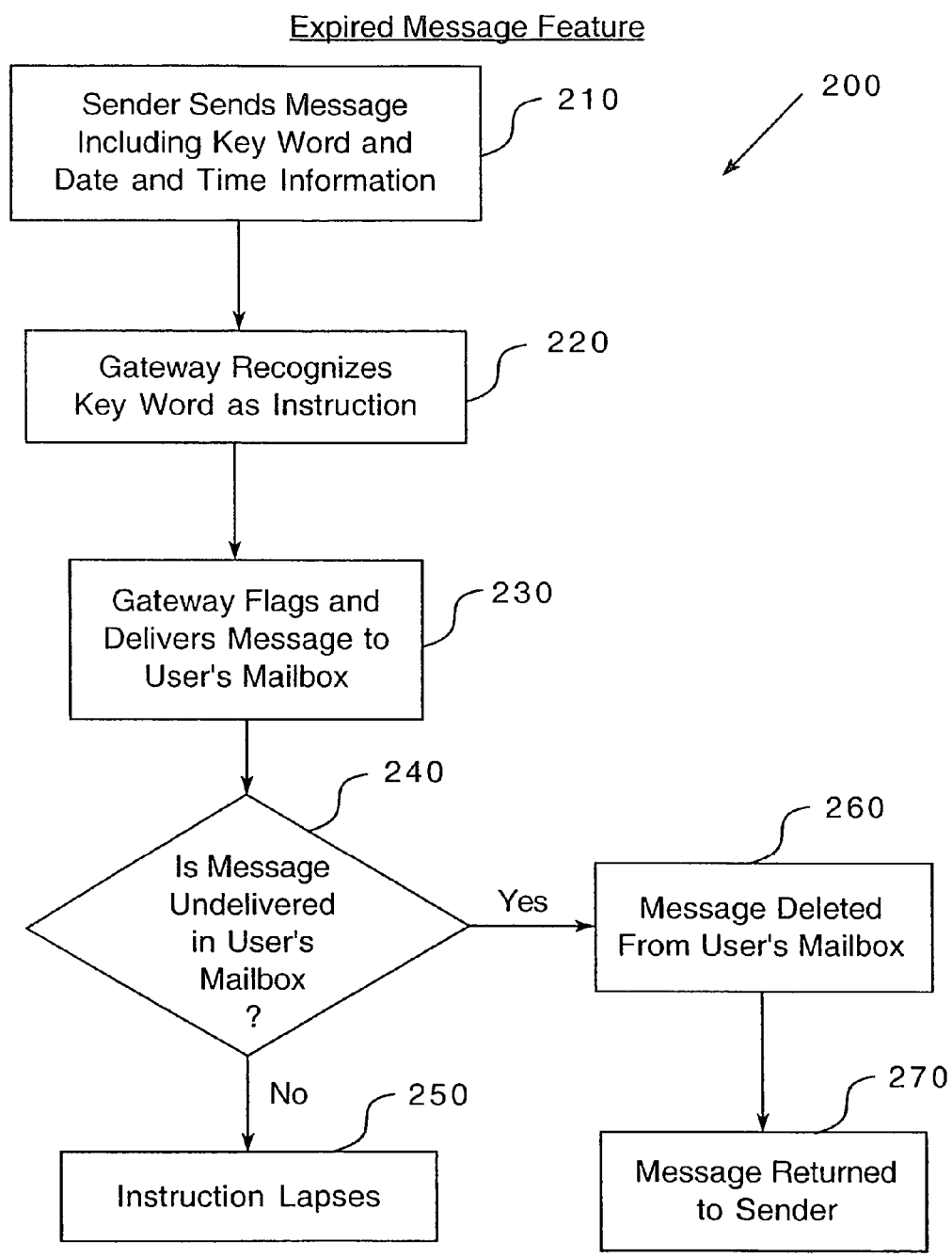
FIG. 2 is a flow chart showing an implementation of the expired message feature of the present disclosure.

FIG. 2 is a flow chart 200 showing how the expired message feature may be implemented. Using an Internet-compatible email program, the sender sends a text message to the user including a key word such as .EXPIRE followed by date and time information (step 210). For example, the phrase .EXPIRE 5 in the text of the message may indicate an instruction to the gateway that the delivery time for the message will expire in five minutes, i.e., that if the message is not received by the user's wireless device within five minutes, then the message should be deleted from the system. Alternatively, the text command for the expired message feature may have the following format: EXPIRE MM/DD/YY hh:mm, which represents an instruction to the gateway to attempt to deliver the message at month MM, day DD, year YY at hour and minute hh:mm. As an alternative to including the key word in the text message itself, the sender may include an SMTP header for the message having a format such as EXPIRE MM/DD/YY hh:mm.

The gateway recognizes the key word as an instruction regarding delivery of the message (step 220). The gateway flags and delivers the message to the user's mailbox (step 230), where it is stored until the specified expiration date and time. The file name associated with the flagged message is the date and time that the message will expire.

When the gateway determines that the specified expiration date and time have been reached, the gateway looks to see whether the message remains undelivered in the user's mailbox (step 240). In particular, the gateway may open the flagged file identified by the specified date and time. If the message is no longer in the user's mailbox because it has been delivered to the user's wireless device, the expired message feature is deemed to have lapsed (step 250). If the message remains undelivered in the user's mailbox, it is deleted from the user's mailbox (step 260), and is returned to the sender by a return email message (step 270).

To carry out the expired message feature, the gateway may include database having a directory called EXPIRE. This directory is divided into subdirectories corresponding to each user's access number, and each access number subdirectory having a further subdirectory for the flagged file name (i.e., the specified expiration date and time). The gateway continuously executes a program designated EXPIRE, and when the date and time match the date and time flag of a file in one of the subdirectories, the protocol machine opens the files with that designation, and if it still in a user's mailbox as undelivered, deletes the message.

Deferred Delivery Feature

Another feature of an interactive wireless system of the present disclosure allows the sender to send a message to the user of the wireless device, but defer delivery of the message until a specified date and time. Using the deferred delivery feature, the sender sets the delivery date and time for a message to be sent to the user.

Figure 3:
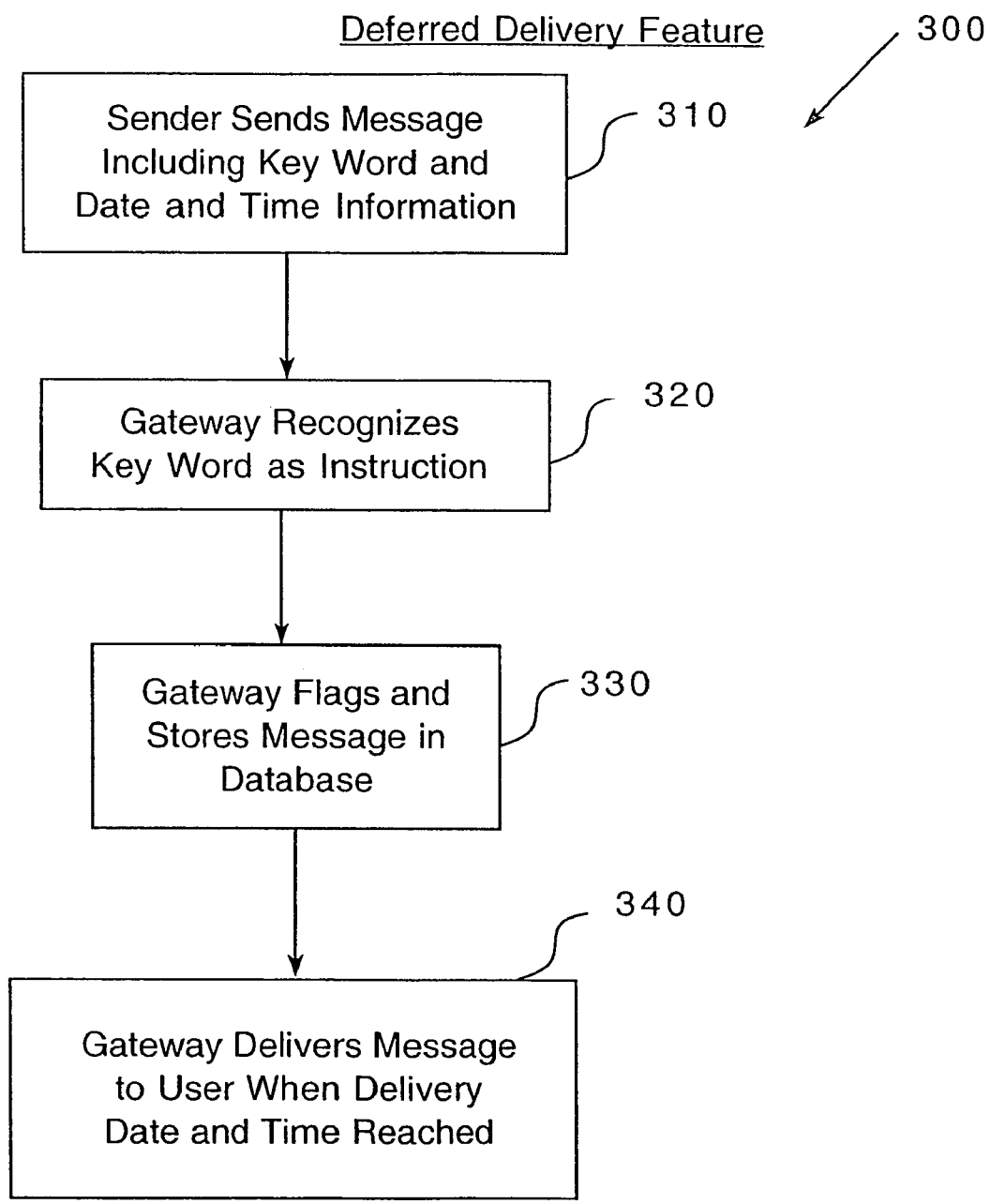
FIG. 3 is a flow chart showing an implementation of the deferred delivery feature of the present disclosure.

FIG. 3 is a flow chart 300 showing how the deferred delivery feature may be implemented. Using an Internet-compatible email program, the sender sends a text message to the user including a key word such as .DELIVER followed by specified date and time information in the text of the message or in an SMTP header of the message (step 310). The text command for this feature may have the following format: DELIVER MM/DD/YY hh:mm, which represents in instruction to the gateway to attempt to deliver the message at month MM, day DD, year YY at hour and minute hh:mm.

The gateway recognizes the key word as an instruction regarding delivery of the message (step 320). The gateway flags and stores the message in a message store database until the specified delivery date and time (step 330), similar to the protocol for the expired message feature. When the gateway determines that the specified delivery date and time have been reached, the message is delivered to the user's mailbox for delivery to the user's wireless device (step 340). For example, the gateway may store the message in a DELIVER subdirectory corresponding to the user's account number under a flagged file name including the specified delivery date and time. A DELIVER protocol executed by the gateway then determines whether the date and time match the date and time of a file in one of the DELIVER subdirectories, at which time the gateway places the message in the user's mailbox to be delivered to the user's wireless device.

The deferred delivery feature has several applications. One application is that a message sent by the sender, at a time that may be inconvenient for the user of the wireless device to receive the message or when the user cannot be disturbed, may be delivered at a more convenient time for the user. Another application is as a reminder service, in which a reminder message sent by the sender is delivered to the user of the wireless device at a specified date and time.

A related feature of the deferred delivery feature would allow the sender to cancel a deferred delivery message that the sender has sent or to modify the date and time at which the message is to be delivered to the user.

The deferred delivery feature may be combined with the mail expiration feature in a single message. Thus, the sender can specify that a message be delivered to the user at a specified date and time, but if the user is unable to receive the message at the specified date and time because the wireless device is not on air or is out of range, the message may expire within a specified amount of time and be deleted from the user's mailbox.

"No Mailbox" Feature

Another feature of the wireless system of the present disclosure allows the sender to designate that a message not immediately delivered to the user's wireless device be deleted from the user's mailbox and returned to the sender as undelivered. For example, the sender may desire that if a message containing an urgent request is not received immediately, he or she will resend the message to another user who is on air and can deal with the urgent request.

Figure 4:
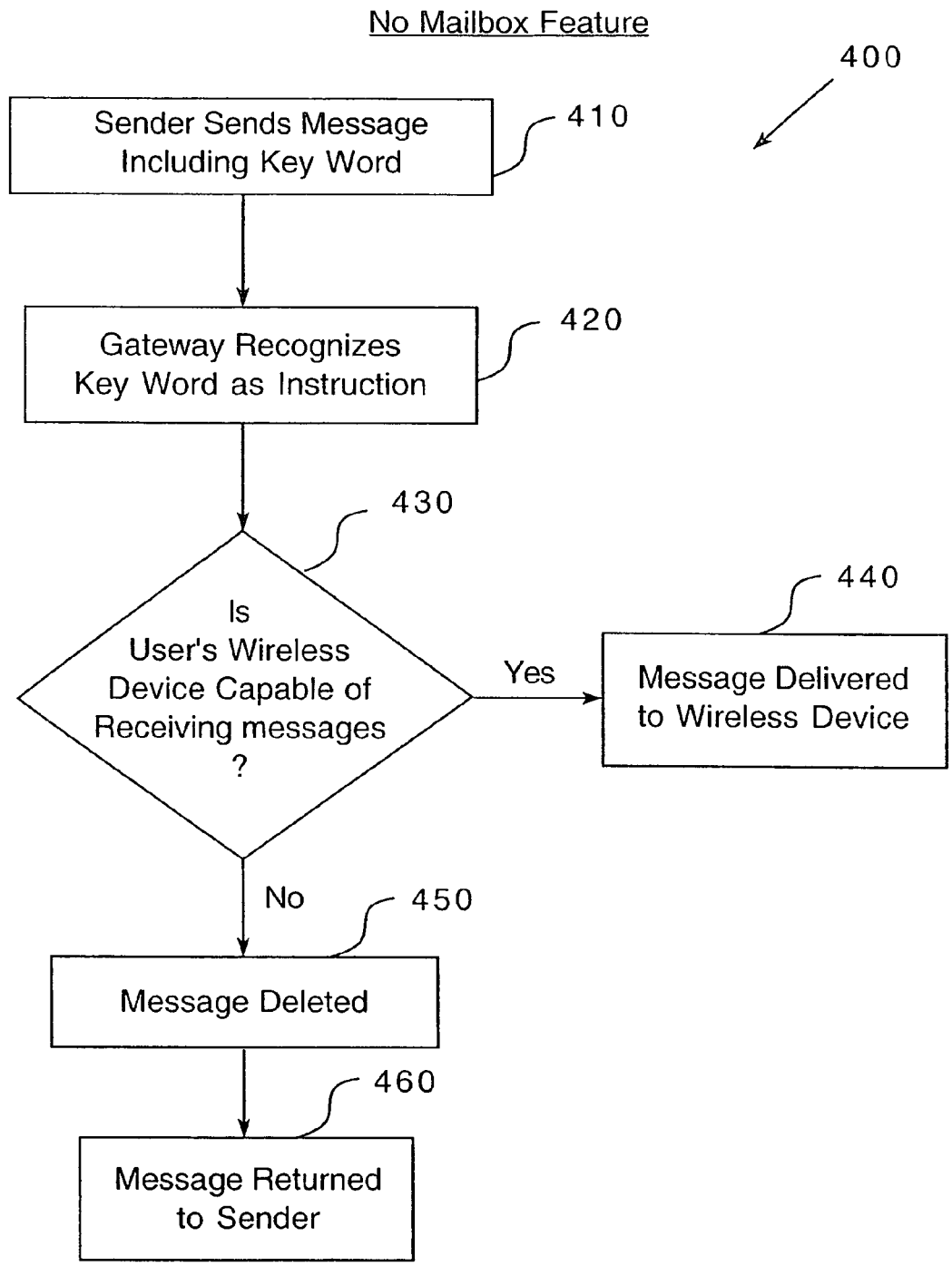
FIG. 4 is a flow chart showing an implementation of the "no mailbox" feature of the present disclosure.

FIG. 4 is a flow chart 400 showing how the "no mailbox" feature may be implemented. Using an Internet-compatible email program, the sender sends a text message to the user including a key word such as .NOMAILBOX in the text of the message or in an SMTP header of the message (step 410). The gateway recognizes such a key word as an instruction regarding delivery of the message (step 420). The gateway then determines whether the user's wireless device is capable of receiving message, i.e., on air and within range (step 430). If the user's wireless device is on air and within range, the message is delivered to the user's wireless device (step 440). If the user's wireless device is not on air or is outside the service range, the message is deleted from the user's mailbox (step 450) and returned to the sender (step 460), e.g., by a return email message via the Internet.

The "no mailbox" feature is similar to the expired message feature, except that the message expires immediately if the wireless device does not receive the message.

Web Site Access

A further feature of the wireless system of the present disclosure allows the user of a wireless device to request text information from an Internet web site over the wireless network.

To implement the web site access feature, a series of scripted formats are programmed as protocols performed by the gateway.

Figure 5:
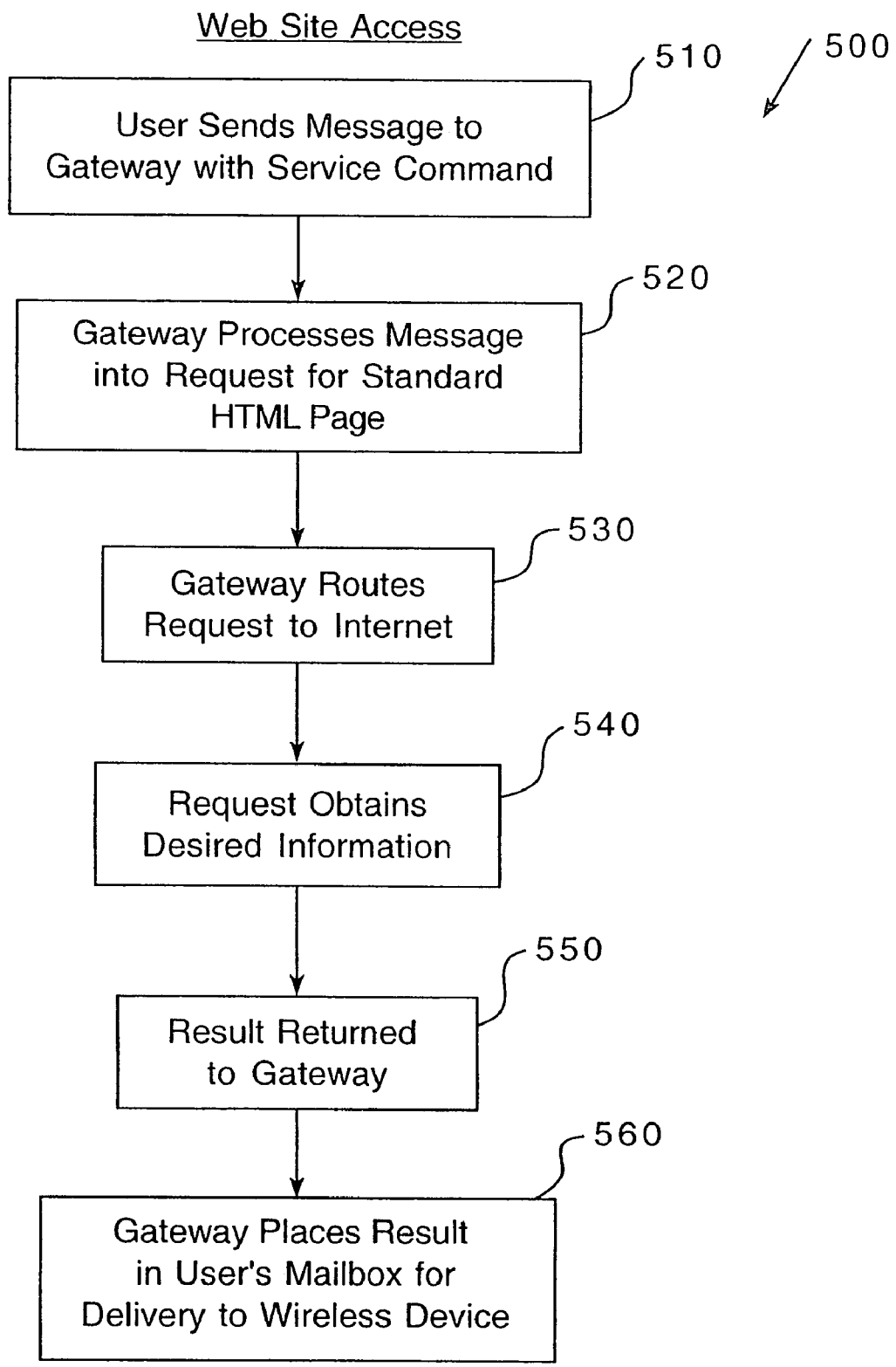
FIG. 5 is a flow chart showing an implementation of the web site access feature of the present disclosure.

FIG. 5 is a flow chart 500 showing how the web site access feature may be implemented using the example of obtaining a stock price quote obtained from the Internet. The user sends a message to a designated address in the gateway, e.g., DATA, with a service command in the subject line of the message (step 510). For example, the user may request a stock price quote for the publicly traded company identified by the initials BLS using a message having the following scripted format:

TO: DATA
SUBJECT: QUOTE BLS

The gateway processes the user's message into the format of a request usable by a standard HTML page of a designated web site (step 520), and routes the request through the gateway to be transmitted over the Internet (step 530). The gateway sends an email request to a standard HTML page, instead of accessing a web page to look up the requested information. The request may be sent, e.g., to a service that provides current stock prices such as the stock quote service provided by Yahoo's Internet Service Provider.

The request asks for the desired stock quote information in the form of text information from the designated web site (step 540). The result is returned to the gateway in the form of an email message (step 550), which the gateway places in the user's mailbox for delivery to the user's wireless device (step 560).

Another example of information that the user may request using the web site access feature is airline flight information. For example, information for Delta Airlines Flight 001 may be requested in the form SUBJECT: DELTA 001 from a wireless device. The information returned to the wireless device may be the current status, arrival time and gate number for the specified flight.

The web site access feature may have an additional feature in which a list of available scripted formats may be obtained by sending a help message to the gateway, e.g., with a command in the form SUBJECT: HELP_ALL.

Other embodiments are within the scope of the following claims.

What is claimed is:

1. A message delivery method comprising:
   receiving a message from the Internet, the message including delivery instruction and delivery information indicating a time at which the message is to be delivered to a communication device of a recipient over a wireless messaging network as well as an expiration time for the message, the expiration time causing the message to expire if the message cannot be delivered to the recipient at the time the message is to be delivered, wherein if the message expires the message is deleted before being delivered to the recipient, the delivery instruction and delivery information being embedded in the message;
   storing the message; and
   delivering the message over the wireless messaging network to the communication device of the recipient at a time indicated by the delivery information, wherein the delivery instruction and the delivery information are set by a sender of the message.

2. The method of claim 1, further comprising:
   after receiving the message, recognizing the delivery instruction and delivery information as instructions for delivering the message, wherein the delivery instruction and delivery information are embedded in a body of the message.

3. The method of claim 1, wherein the communication device is a wireless device.

4. The method of claim 1, wherein the delivery information comprises numeric values which set parameters for message delivery.

5. The method of claim 1, wherein the message is delivered to a mailbox of the recipient.

6. The method of claim 1, wherein the message is delivered to a mailbox of the recipient for delivery to the communication device of the recipient.

7. The method of claim 1, wherein the message is a reminder for the recipient.

8. The method of claim 1, further comprising:
   canceling the delivery instruction before the message is delivered.

9. The method of claim 1, further comprising:
   modifying the delivery information before the message is delivered.

10. The method of claim 1, wherein the delivery instruction and delivery information are in a header of the message.

11. A computer readable medium having a computer program for message delivery, the program performing:
    receiving a message from the Internet, the message including delivery instruction and delivery information indicating a time at which the message is to be delivered to a communication device of a recipient as well as an expiration time for the message, the expiration time causing the message to expire if the message cannot be delivered to the recipient at the time the message is to be delivered, wherein if the message expires the message is deleted before being delivered to the recipient, the delivery instruction and delivery information being embedded in the message;
    storing the message; and
    delivering the message over a wireless messaging network to the communication device of the recipient at a time indicated by the delivery information, wherein the delivery instruction and the delivery information are set by a sender of the message.

12. The medium of claim 11, the program further comprising:
    after receiving the message, recognizing the delivery instruction and delivery information as instructions for delivering the message, wherein the delivery instruction and delivery information are embedded in a body of the message.

13. The medium of claim 11, wherein the communication device is a wireless device.

14. The medium of claim 11, wherein the delivery information comprises numeric values which set parameters for message delivery.

15. The medium of claim 11, wherein the message is delivered to a mailbox of the recipient.

16. The medium of claim 11, wherein the message is delivered to a mailbox of the recipient for delivery to the communication device of the recipient.

17. The medium of claim 11, wherein the message is a reminder for the recipient.

18. The medium of claim 11, the program further comprising: canceling the delivery instruction before the message is delivered.

19. The medium of claim 11, the program further comprising: modifying the delivery information before the message is delivered.

20. The medium of claim 11, wherein the delivery instruction and delivery information are in a header of the message.

* * * * *